United States Patent [19]

Misumi et al.

[11] Patent Number: 4,977,781
[45] Date of Patent: Dec. 18, 1990

[54] VORTEX FLOW METER

[75] Inventors: Masao Misumi; Koji Atsumi, both of Tokyo, Japan

[73] Assignee: Oval Engineering Co., Ltd., Tokyo, Japan

[21] Appl. No.: 398,197

[22] Filed: Aug. 24, 1989

Related U.S. Application Data

[62] Division of Ser. No. 283,656, Dec. 13, 1988, Pat. No. 4,891,989, which is a division of Ser. No. 24,294, Mar. 10, 1987, Pat. No. 4,838,092.

[30] Foreign Application Priority Data

Mar. 15, 1986 [JP] Japan .............................. 61-037995
Mar. 15, 1986 [JP] Japan .............................. 61-037996
Mar. 16, 1986 [JP] Japan .............................. 61-037828
Mar. 16, 1986 [JP] Japan .............................. 61-057766
Mar. 17, 1986 [JP] Japan .............................. 61-058975
Nov. 19, 1986 [JP] Japan .............................. 61-178079

[51] Int. Cl.⁵ .............................................. G01F 1/32
[52] U.S. Cl. ................................ 73/861.22; 73/861.23
[58] Field of Search ............ 73/861.22, 861.23, 861.24

[56] References Cited

U.S. PATENT DOCUMENTS 3,589,185 6/1971 Burgess ........................... 73/861.22
4,485,680 12/1984 Wada ............................... 73/861.22
4,683,760 8/1987 Misumi ............................ 73/861.22

FOREIGN PATENT DOCUMENTS 0023497 2/1980 Japan ............................... 73/861.22

Primary Examiner—Herbert Goldstein
Attorney, Agent, or Firm—Jordan and Hamburg

[57] ABSTRACT

A vortex flow meter having a vortex generator comprises a plurality of vortex generating elements installed in a fluid passage perpendicular to the fluids flow. An upstream-side vortex generating element and a downstream-side vortex generating element are both arranged in parallel at a predetermined interval therebetween in the direction of the fluid's flow. Zero to plural flat plates are arranged in parallel at equal intervals between both vortex generating elements. The representative length portions of the vortex generating elements are located respectively on the surfaces opposed to each other. The frequency ratio of the vortexes generated, when independently arranged, are 0.7 to 0.9 on the standard basis of the upstream-side vortex generating element.

14 Claims, 7 Drawing Sheets

VORTEX FLOW METER

This is a division, of application Ser. No. 283,656, filed Dec. 13, 1988, now U.S. Pat. No. 4,891,989 said Ser. No. 283,656 being a Division of application Ser. No. 024,294 filed Mar. 10, 1987 now U.S. Pat. No. 4,838,092.

BACKGROUND OF THE INVENTION

The present applicant noticed that, with respect to the construction of a vortex generator, that the components were arranged in parallel at a considerable distance from each other, so as to be opposed to each other vertically in the direction of the flow. That vortex generator, in the vortex flow meter, was described in the published specification of Japanese Patent Publication No. 46-10233/1971 and the effect, based on the mutual structural arrangement of the vortex generators, couldn't be anticipated. Furthermore, the present applicant proposed a vortex flow meter as shown in the published specifications of Japanese Utility Model Publication No. 55-45296/1980, in which two same-shaped and same-sized vortex generators, having a cross section in a triangular shape, are arranged so as to be opposed to each other and the distance therebetween is equal to 0.1 d to 0.9 d when the width of the vortex generator is d. Namely, by limiting the distance between the vortex generators to the above-mentioned area, it was possible to stabilize the Karman vortex.

The vortex flow meter described in the above-mentioned published specification of Japanese Utility Model Publication No. 55-45296/1980 achieved the stabilization of the Karman vortex, and the characteristic curve of instrumental error was superior. However, since the instrumental error increases slowly in the area of a low flow rate, in order to enlarge the measurement range of the flow rate with a high accuracy, the area of high flow rate needed to be expanded. As a result of it, there existed a need for suppressing the increase of pressure loss.

Furthermore, by combining of such vortex generators, the magnitude of vortex circulation was changed by the action of the mutual interference of the vortexes, depending on the magnitude of the distance between them. The vortex generating frequency of a predetermined condition differed from the frequency of a single vortex generator. In the prior art, the vortex generator was an unsatisfactory one for being installed in a device requiring a flow rate control of quick response, because the vortex generating frequency in a constant flow rate was decreased.

The present applicant proposed a Karman vortex generating device in the Karman vortex flow meter described in the published specification of Japanese Patent Publication No. 55-40804/1980 and in which a Karman vortex generator is installed against the fluid's flow at the most pointed end thereof and a large number of respectively, independent element plates for generating Karman vortexes are installed behind the vortex generator at desired intervals.

The above-mentioned Karman vortex generator has an angular point on the flowing axis of the fluid passage and the cross section thereof is in the shape of an equilateral triangle opposed to the fluid's flow and perpendicular thereto. By providing space chambers capable of developing the vortex generated here (i.e. at the Karman vortex generator) to a most suitable intensity by means of a large number of downstream-side element plates for generating Karman vortex (called "flat plate (s)" simply hereafter), a sufficiently strong vortex can be developed in proportion to the downstream position. In consequence, a stable vortex generator can be created.

In the prior art, when a flat plate is put at the downstream-side of the vortex generator the vortex exerts an amplifying effect. Concerning the number of flat plates, the number required for obtaining a vortex of such intensity, so that the vortex is peeled off, is sufficient. In the case of the vortex being peeled off from the flat plate in the final stages, an adequate of the number is selected according to the optimum conditions needed. The time required for peeling off the vortex is short because a sufficiently developed vortex has already been produced up to then. Furthermore, the vortex can be produced with a remarkably stable vortex frequency. However, there existed a subject matter to be settled with the instrumental error being a plus in the area of the low Reynolds number.

The present applicant proposed a vortex flow meter described in the Japanese Patent Application No. 58-60333/1983 (laying-open No. 59-187222/1984), in which a tubular member is disposed behind a vortex generator in a direction of intersecting it and at least one pair of pressure guiding holes are formed at a predetermined interval in the direction of the tubular member's axis. The present applicant noticed that, in the flow meter as mentioned above, the fluid's variation of flow had been caused by applying a variation to the inside of the tubular member, and the fluid's flow had been rectified by guiding a fluid-flowing variation into the tubular member having a comparatively small circumference for passing therethrough. In such a manner, a turbulence vortex contained in the flow of the fluid in the fluid passage wasn't detected as compared with the case when there is no tubular member. Consequently, a noise component of the detection signal of an excellent S/N characteristic was obtained. The detection of the vortex signal already generated was improved in such a manner as mentioned above. And further, with respect to the vortex generator, an acute-angled equilateral triangular element was disposed of in direction of the fluid's flow and independent flat plates were arranged respectively behind the element, in order, at a desired interval, as shown in the published specification of Japanese Patent Publication No. 55-40804/1980. In such a manner, an amplifying effect was given to the vortex and thereby a strong and stable vortex could be generated.

According to the above-mentioned prior art, a stable vortex flow meter which didn't exist in the past could be realized in combination with a vortex generating means for generating a strong and stable vortex and a detection means for detecting the vortex generated by the vortex generating means having an excellent S/N characteristic. However, in order to perform a wider range of flow rate measurement, it was necessary to get a stronger vortex signal and keep the value of the Strouhal number with a wide range and also constant to correspond to the above-mentioned conditions. Furthermore, the vortex flow meter had a plus instrumental error in the low flow rate area, as described in the aforementioned published specifications of Japanese Patent Publication No. 55-40804/1980. Therefore, although the vortex generator was stable, it was unsatisfactory for a flow meter requiring a wide range of flow rate measurement.

SUMMARY OF THE INVENTION

It is an object of the present invention to provide a vortex flow meter having an improved characteristic of instrumental error in a small flow rate are and capable of increasing the frequency of the vortex occurrences.

It is another object of the present invention to provide a vortex flow meter having an excellent characteristic of the Reynolds number.

It is another object of the present invention to provide a vortex flow meter which performs a wide range of flow rate measurement with high-accuracy.

It is another object of the present invention to provide a vortex flow meter capable to improve a characteristic of instrumental error in low Reynolds number area.

It is another object of the present invention to provide a vortex flow meter having a wide range of flow rate measurements.

The above-mentioned features and other advantages of the present invention will be apparent from the following detailed description which goes with the accompanying drawings.

BRIEF DESCRIPTION OF THE DRAWINGS

FIGS. 22 through 25 are structural views for explaining an embodiment of the vortex flow meter according to the present invention, wherein FIG. 22 is a side cross-sectional view thereof, FIG. 23 a cross-sectional view taken along the line 23—23 of FIG. 22, FIG. 24 a detailed view of a tubular member, and FIG. 25 a detailed view of raw cloth.

DESCRIPTION OF THE PREFERRED EMBODIMENTS

The present applicant noticed the ratio of the vortex frequency caused by the vortex generator installed perpendicular to the fluid's flow in the fluid passage, and consequently carried out several experiments. As a result, it was confirmed that, in the case of selecting the distance t (t=0.1d~0.9d) between the bottom surfaces of the vortex generators wherein d is the length of the base side of the vortex generator, the instrumental error at a small flow rate range had been remarkably improved by the combination of the vortex frequency ratio of 0.7 to 0.9 on the standard basis of the upstream side vortex generator, and further, the vortex frequency had been increased.

Figure 1:
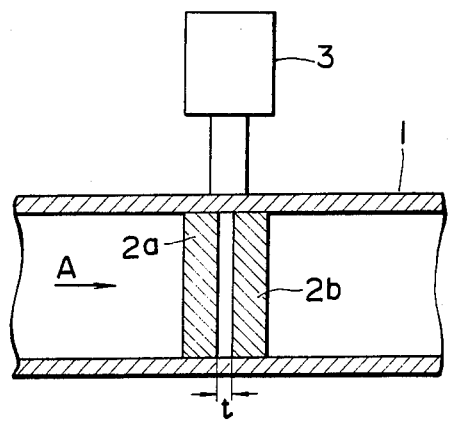
FIG. 1 is a side cross-sectional view showing the construction of a vortex flow meter according to the present invention.
Figure 2:
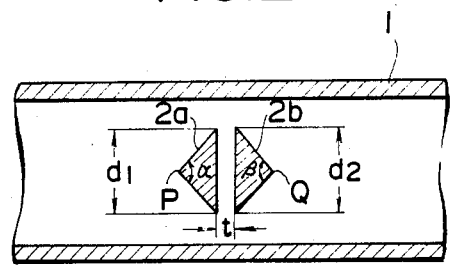
FIG. 2 is a plane cross-sectional view showing the same.

FIGS. 1 and 2 are, respectively, a side cross-sectional view of a vortex flow meter according to the present invention and a plane, cross-sectional view of the same. In a fluid passage 1, a pair of vortex generators 2a and 2b are arranged in parallel to each other and perpendicular to the direction A of fluid flow. A vortex signal converted to an electric signal by the vortex detector, not shown in FIGS. 1 and 2, is amplified and reshaped (converted to a rectangular wave form) by a preamplifier 3. The vortex generators 2a and 2b contain, respectively, angular points P and Q on the axis of the fluid's flow. The cross section of both of the vortex generators is in the shape of an isosceles triangle with vertical angles $\alpha$ and $\beta$ and base sides $d_1$ and $d_2$. The respective bottom surfaces thereof are arranged at a predetermined distance t. Moreover, the vertical angles are determined by the vortex frequency as a condition of the present invention.

Figure 3:
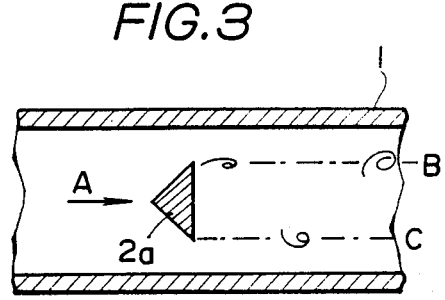
FIGS. 3 and 4 are views for explaining the operation of the flow meter according to the present invention.
Figure 4:
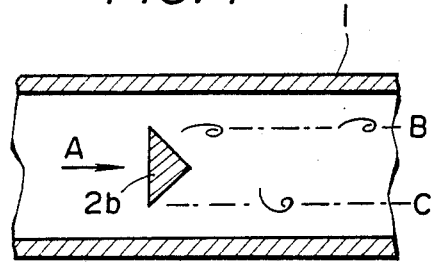
Figure 5:
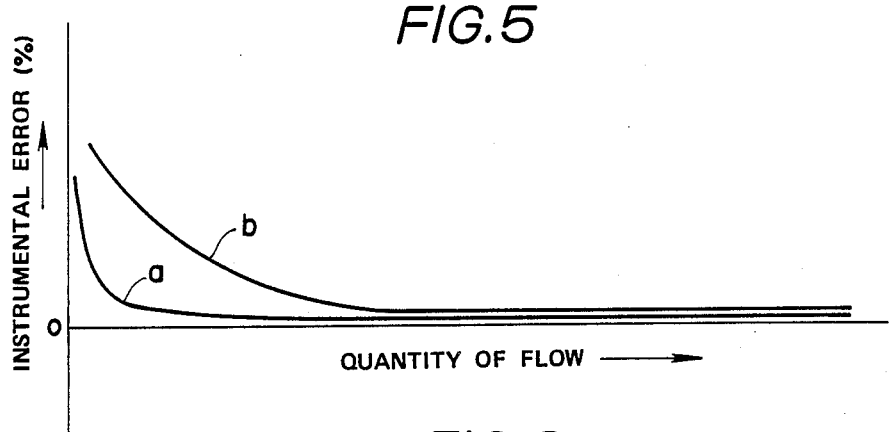
FIG. 5 is a graph showing the characteristics of the instrumental error.

FIG. 3 and FIG. 4 show, respectively, occurrence states of the vortex rows B and C in the case of installing each of the vortex generators 2a and 2b alone against the fluid's flow. Those states are shown for explaining the present invention. According to the results of the experiment, the frequency of the vortex, generated by the vortex generators in a shape of an isosceles triangle with the vertical angles $\alpha$ and $\beta$ ($\alpha=\beta=40°$) and the base sides $d_1$ and $d_2$ ($d_1=d_2$), is equal to 340 Hz in FIG. 3, and equal to 190 Hz in FIG. 4. The ratio of the frequency in FIG. 4 relative to the frequency in FIG. 3 is 0.56. The combinational vortex frequency turns out to be 170 Hz. When the vortex generators are arranged at an interval t (t=0.1d), the characteristic of instrumental error tends to increase in a plus direction, in the low flow rate area as shown by the curve (a) in FIG. 5.

On the contrary, supposing that the vertical angles $\alpha$ and $\beta$ increase and get nearer to a flat plate condition, the vortex frequency also increases. For example, in the case of $\alpha=90°$, $\beta=100°$, and $d_1=d_2$, the respective frequencies of the vortexes shown in FIG. 3 and FIG. 4 are 310 Hz and 260 Hz. The ratio of those frequencies is. The characteristic of instrumental error on the condition of t=0.2 d is considerably improved in the low flow rate area as shown by the curve (a) in FIG. 5. The vortex frequency turns out to be 300 Hz and increases to approximately 1.8 times compared with the characteristics of the conventional flow meter (shown by the curve (b) in FIG. 5).

As is apparent from the foregoing Japanese Patent Publication No. 55-40804/1980, the characteristic of instrumental error has been improved by noticing the vortex frequency ratio of the vortex generators alone and ratio combining them with each other. Furthermore, it follows that the frequency of the vortex occurrence increases and the application area is enlarged in the field of the vortex flow meter combined with the control system requiring a quick response.

The present applicant observed the vortex generation frequency ratio of the vortex generator installed in the fluid passage and further conducted several experiments. As a result, it was discovered that, by noticing the vortex generation frequency ratio of the vortex generator, located on the upstream position, and the flat plate capable of amplifying the vortex, in particular, the flat plate located in the final stages, in the case where the other vortex generator is installed in the final stages in place of the above-mentioned flat plate and the ratio of vortex generation frequency has a value of predetermined ratio, the Reynolds number: the characteristic of instrumental error was improved. The present invention was created in order to propose a vortex generator having an excellent Reynolds number characteristic on the basis of this discovery.

Figure 6:
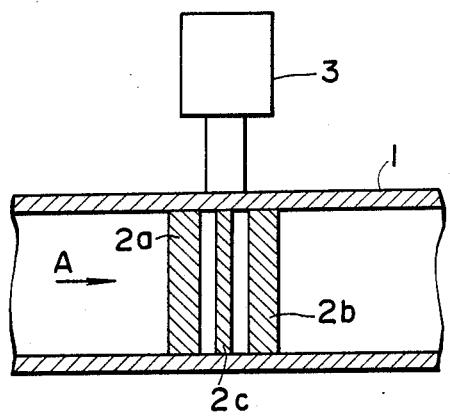
FIG. 6 is a side cross-sectional view of a vortex flow meter according to the present invention.
Figure 7:
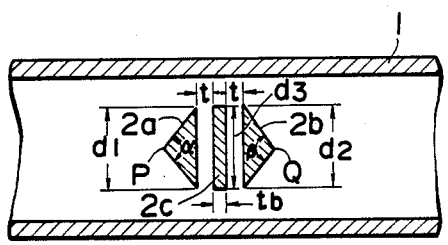
FIG. 7 is a plane cross-sectional view thereof.

FIG. 6 and FIG. 7 are, respectively, a side cross-sectional view of a vortex flow meter, according to another embodiment, and a plane cross-sectional view of the same. In the fluid passage 1, a pair of vortex generators 2a and 2b are arranged parallel to each other and perpendicular to the direction A of fluid flow. The vortex generators 2a and 2b contain, respectively, angular points P and Q on the axis of the fluid's flow. The cross section of both the vortex generators is in the shape of an isosceles triangle, respectively, with vertical angles $\alpha$ and $\beta$ and base sides $d_1$ and $d_2$. Between the respective vortex generators 2a and 2b, a flat plate 2c having a width $d_3$ and a thickness $t_b$ of $0.1d_1$ to $0.4d_1$ ($t_b = 0.1d_1 \sim 0.4d_1$) is installed between the vortex generators 2a and 2b at an equal distance from both of them. The vortex signal is converted to an electric signal by the vortex detector not shown in FIGS. 6 and 7, and is amplified and reshaped (i.e. converted to a rectangular wave form) by a preamplifier 3.

Moreover, although, in FIGS. 6 and 7, only one flat plate 2c is shown for an explanation thereof, it might be possible to use multiple flat plates. The flat plates correspond to that acting as a vortex amplifying member in the prior art. The circulation of the vortex, at the moment when the vortex is peeled off from the final-stage flat plate, is represented as the sum of the vortex's circulation around the respective flat plates and the sum of the vortex's revolution occurring between the respective flat plates in the prior art. Although the vortex frequency is proportional to the Strouhal number, the latter (i.e. the Strouhal number,) is an inverse function of the circulation. Consequently, the value of the vortex frequency in the prior art is approximately close to that of the flat plate group which is a combination of the individual flat plates.

However, the vortex frequency of the upstream-side vortex generator alone is higher than that of the flat plate group. Therefore when the amplifying action of the flat plate group is small in the low Reynolds number area, the vortex frequency of the vortex generator alone has priority over the other. When the Reynolds number becomes sufficiently high and the vortex intensity also becomes high, by the action of vortex amplification, the vortex frequency of the flat plate controls the device instead of that of the vortex generator. In such a manner, the instrumental error is transferred to the plus value with higher on-going frequency in the lower Reynolds area. On the contrary, the characteristic of the instrumental error becomes safe and flat in the higher Reynolds area.

However, in the case of installing a vortex generator having a voltage frequency near to that of the upstream-side vortex generator, in parallel therewith, instead of the final stage flat plate, it is considerably affected by the following stage. Therefore, the subject matter as mentioned before is settled, and the vortex meter having a flat Reynolds characteristic can be obtained. According to the results of the experiment, on the standard basis of the vortex frequency of the upstream-side vortex generator 2a, the ratio of the frequency of the vortex generator and that of the lower stage (downstream-side) vortex generator 2c becomes equal to approximately 0.8. This value is considered to be the best one. Thereby, the Reynolds number due to the representative length d of the vortex generator turns out to be $2.5 \times 10^3$ or more, namely, a flat characteristic of instrumental error can be obtained.

Moreover, in the case that the representative widths (lengths) $d_1$, $d_2$ and $d_3$ of the preceding and following vortex generators are made equal to each other ($d_1 = d_2 = d_3$), the thickness $t_b$ of the flat plate is $0.1d_1$ to $0.4d_1$ ($t_b = 0.1d_1 \sim 0.4d_1$), and the values of the respective distances t between the flat plate and both the vortex generators are also equal to each other. With respect to the values as mentioned above, the most superior characteristic could be obtained in the Reynolds number and stability obtained when the other condition the selected within the area of $t = 0.1d_1 \sim 0.9d_1$.

Figure 8:
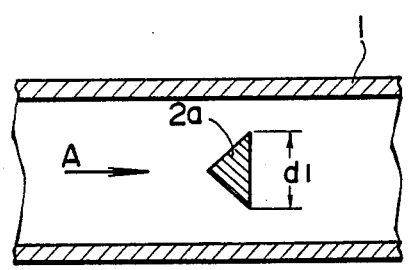
FIGS. 8 and 9 are explanatory views for explaining the positional relationship for getting the vortex frequency of the vortex generator alone.
Figure 9:
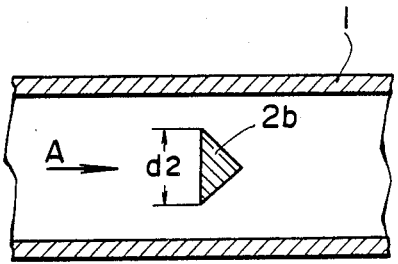

Concerning the angular points $\alpha$ and $\beta$ of the vortex generators 2a and 2b, both of $\alpha$ and $\beta$ are equal to 90° ($\alpha = \beta = 90°$). Needless to mention, even though $\alpha$ is not equal to $\beta$ ($\alpha \neq \beta$), it will be permitted to satisfy the vortex frequency ratio of the afore-mentioned vortex generators alone. Moreover, the vortex frequency of the vortex generators alone can be obtained as a construction in which the representative widths (lengths) d are located at the downstream-side and at the upstream-side as shown in FIGS. 8 and 9.

As is apparent from the foregoing description, according to the present embodiment, it is possible to obtain a vortex generator having the excellent characteristic of instrumental error and the Reynolds number, while keeping the vortex stable. Furthermore, since the vortex frequency is high, the device according to the present invention can be applicable to a wide range of flow rate measurements. And further it can be applicable also to a vortex flow meter for employment in a control system requiring a quick response.

Furthermore, the present applicant noticed the vortex generating frequency ratio of the vortex generator while in the state of being installed in a fluid passage, and conducted further several experiments. As a result, it was discovered that the Reynolds number for the characteristic of instrumental error especially that of characteristic in the low Reynolds number area had been improved, in the case of applying the preceding-stage flat plate of the prior art to the element performing the function of vortex amplification, and arranging the final-stage flat plate so as to be opposed to the vortex generating element having certain vortex frequency, wherein the ratio of the vortex frequency thereof and that of the upstream-side vortex generating element is 0.7 to 0.9. Furthermore, it was necessary to provide a vortex flow meter having a constant instrumental error characteristic over a wide range of a low rate measurement, in case that the shape of the upstream-side vortex generating element's cross section is arch-shaped in order to satisfy the above-mentioned condition, and the shape of the downstream-side vortex generating element's cross section is T-shaped.

Figure 10:
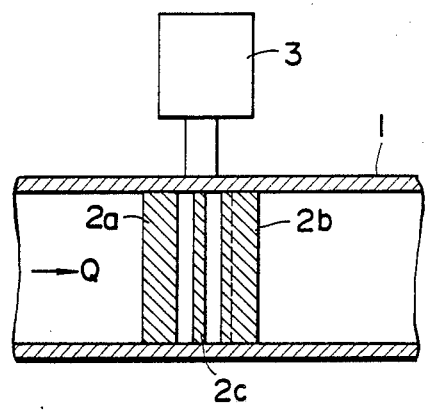
FIGS. 10 and 11 are, respectively, a side cross-sectional view and a plane cross-sectional view of the vortex flow meter according to the present invention.
Figure 11:
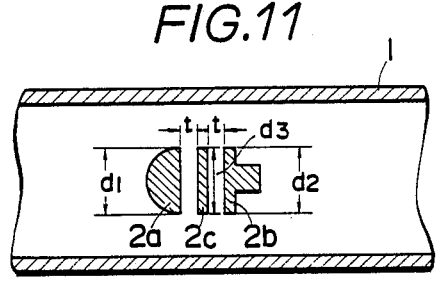

FIG. 10 is a side, cross-sectional view of an embodiment of the vortex flow meter according to another embodiment, and FIG. 11 is a plane, cross-sectional view thereof. In FIGS. 10 and 11, vortex generating elements $2a$ and $2b$ are installed in a fluid passage 1 against the fluid's flow in parallel so as to be opposed to each other in the direction of the flow A and perpendicular thereto. The vortex generating element $2a$ has an arch-shaped cross section, the arc of which faces the fluid's flow. A semi-sircular cross section of the diameter $d_1$ is shown in FIG. 11. A cross section of the vortex generating element $2b$ is T-shaped, and its bottom portion has a width $d_2$ and is parallel to the chord of the afore-mentioned vortex generating element $2a$. A flat plate element $2c$ of width $d_3$ is disposed between the respective vortex generating elements $2a$ and $2b$ at an equal interval therefrom. It is preferable to make the widths $d_1$, $d_2$ and $d_3$ of the vortex generating elements $2a$ and $2b$ and the flat plate element $2c$ equal to the width d ($d=d_1=d_2=d_3$), respectively. The respective distances t between $2a$ and $2c$ and between $2c$ and $2b$ are 0.1 d to 0.9 d ($t=0.1d\sim0.9d$).

The vortex signal is converted to an electric signal by a vortex detector, (not shown in FIGS. 10 and 11), and it is amplified and reshaped (converted to a rectangular wave form) by a preamplifier 3. The vortex signal is processed in such a manner. Although the flat plate element gives a vortex amplifying action, the afore-mentioned prior art vortex generator in combination with a triangular pillar and a flat plate, have the characteristic of instrumental error increasing in the low flow rate area. The vortex frequency is proportional to Strouhal number, but the Strouhal number decreases in proportion to the increase of the vortex's intensity. Therefore, the vortex's frequency is an inverse function of the vortex's intensity. In combining the flat plate with the others, the vortex's intensity increases through by the action of the vortex amplification. However, the vortex intensity of the triangular pillar alone is located at the upstream-side. In the case of constructing the vortex generator in combination with those elements, the respective vortex characteristics mutually exert an influence upon each other. And further, since a combination is newly created in connection with the fluid's flowing velocity, the influence exerted by the triangular pillar located at the upstream-side is large in the low flow rate area of the prior art as mentioned before. It follows that the flow meter has an increasing characteristic of instrumental error in the low flow rate area.

Figure 12:
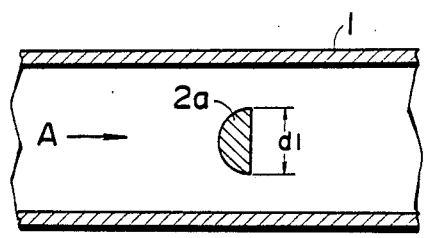
FIGS. 12 and 13 are plane cross-sectional views of cases for installing, respectively, vortex generating elements alone in a fluid passage.
Figure 13:
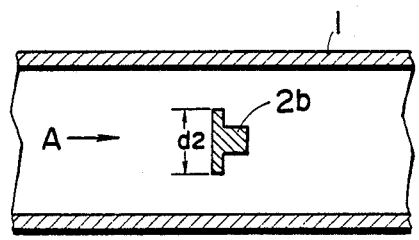

As mentioned before, the present applicant proposed to make the ratio of the vortex frequency of the downstream-side vortex generating element and that of the upstream-side vortex generating element 0.7 to 0.9. However, as shown in FIGS. 12 and 13, the ratio of the vortex frequency of the arch-shaped vortex generating element $2a$ (in FIG. 12) of chord length (width) $d_1$ installed in the fluid passage 1 against the fluid's flow, in the direction of the flow A and perpendicular to that of the T-shaped vortex generating element $2b$ (in FIG. 13) of the width $d_2$ was in the afore-mentioned range of 0.7 to 0.9. Both of the widths $d_1$ and $d_2$ were equal to d ($d_1=d_2=d$). A flat plate element of the width $d_3$ ($d_3=d$) was disposed at the center position between those elements. When the respective distances t between $2a$ and $2c$ and between $2c$ and $2b$ were made 0.1 d to 0.9 d, the $2c$ and $2b$ were made 0.1 d to 0.9 d, the flow meter had a flat characteristics of a flow rate and instrumental error over a wide range of flow rate measurement from a small flow rate area to a large flow rate area. All of the above-mentioned matters are confirmed in the present invention. Furthermore, the flow meter of the present invention has a stable characteristic and generates a strong vortex signal.

As is apparent from the foregoing description, according to present invention, it is possible to provide, in practice a vortex flow meter which performs a wide-range of a flow rate measurement with high-accuracy and a stable flow rate measurement of a small instrumental error in a wide Reynolds number area.

Moreover, according to the experiment performed above, the stability of the vortex is inferior when the flat plate doesn't exist between the vortex generating elements. However, if the distance between the vortex generating elements and the vortex frequency ratio are respectively set to the value mentioned before, the characteristic of the instrumental error improved.

Figure 14:
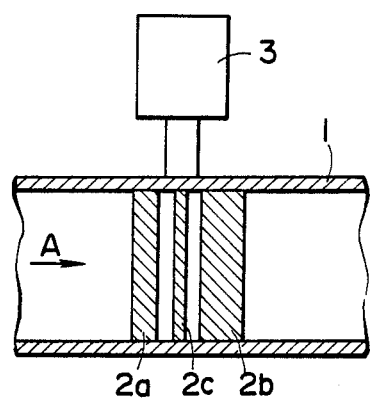
FIG. 14 is a side cross-sectional view of a vortex flow meter according to the present invention.
Figure 15:
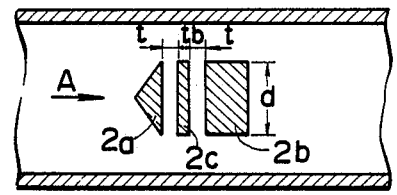
FIG. 15 is a plane cross-sectional view thereof.

FIG. 14 is a side cross-sectional view of a vortex flow meter according to another embodiment, and FIG. 15 is a plane cross-sectional view of the same. In a fluid passage 1, a pair of vortex generators $2a$ and $2b$ are arranged in parallel against the fluid's flow in the direction of flow A and perpendicular thereto. A flat plate $2c$ is placed in a central position between the vortex generating elements $2a$ and $2b$ and parallel to those elements. A vortex generator is constructed in combination with the vortex generating elements $2a$, $2b$ and the flat plate $2c$.

The representative length d of the vortex generating element is equal to the width of the opposing surfaces of the upstream-side and downstream-side vortex generating elements $2a$, $2b$. The most optimum thickness $t_b$ of the flat plate $2c$ is 0.1d to 0.4d ($t_b=0.1d\sim0.4d$). The distance t between the respective vortex generating elements needs to be 0.1d to 0.9d ($t=0.1d\sim0.9d$). The vortex signal is converted to an electric signal by the vortex detector not shown in FIGS. 14 and 15, and it is amplified and reshaped converted to a rectangular-shaped wave form by a preamplifier 3. The vortex signal is processed in such a manner.

Moreover, although only one flat plate $2c$ is shown in FIGS. 14 and 15, it's possible to use plural flat plates or to omit the flat plate as the occasion demands.

In consideration of the characteristics of the 'prior art' vortex flow meter, from the view point of its circular action, the action of the vortex, at the moment when the vortex is peeled off from the final stage (the downstream-side), the flat plate is represented by the sum of the vortex action around the respective flat plates and the sum if the vortex action occurring between the respective flat plates. The vortex frequency is proportional to the Strouhal number, even of the fluid's velocity of flow is constant when the Strouhal number changes. In accordance with the theory of hydrodynamics, the Strouhal number is in inverse proportion to the magnitude of the circular action.

In consequence, the vortex frequency in the prior art is determined by the afore-mentioned circular action having a vortex amplifying function at the flat plate side, and thereby the vortex frequency is lower in the high Reynolds number area of the amplifying function range, the extent of the vortex amplifying function having decreased in the low Reynolds number area, and the action of the upstream-side vortex generating element has priority over the other. And further, since the magnitude of it circular action is small, the vortex frequency becomes higher and the instrumental error tends to the plus side. Namely, the total instrumental error is such that it is flat in the large flow rate area and it increases to a plus value in the small flow rate area.

Figure 16:
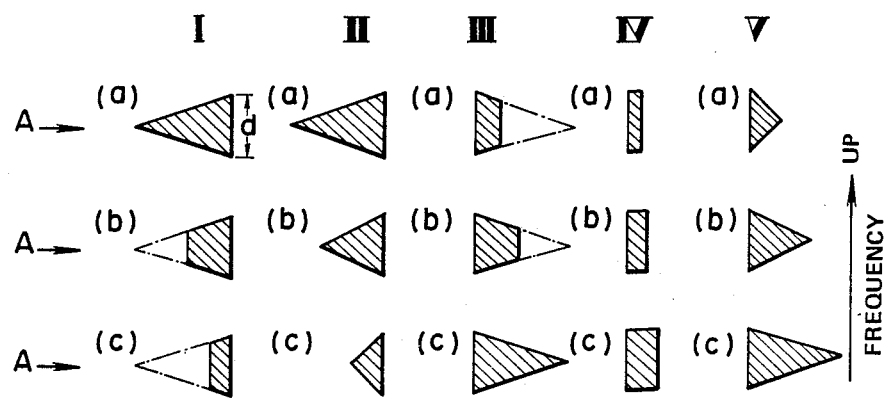
FIG. 16 is a view showing a tendency of the vortex frequency in the fundamental symmetrical cross section.

In FIGS. 14, 15 are shown an embodiment in which the upstream-side vortex generating element 2a is in the shape of on isosceles triangle while the down-stream side vortex generating element 2b is rectangular. FIG. 16 shows various forms of representative cross sections of the vortex generating element and frequency variation tendencies of the vortex caused by the fluid's flow in the direction A. Although a form, such as a circular arc or a T-shape is omitted in this embodiment, there are similarities to the equilateral triangle and the rectangle. FIG. 16 shows trapezoids in I and III, triangles in II and V, and a rectangle in IV. With respect to the respective forms of the cross section, the vortex generating element of group (a) generates a vortex of the highest frequency, that of group (c) generates a vortex of the lowest frequency, and that of group (b) generates a vortex of medium frequency.

Even though the vortex generating elements have the same shape, the vortex frequencies differ from each other depending on whether the representative lengths d of the elements are located at the upstream-side or at the downstream-side. The upstream-side element generates a low vortex frequency, while the downstream-side element generates a high vortex frequency. Consequently, in the present invention, it will be possible to combine those vortex generating elements as the fundamental construction elements shown in FIG. 16.

Figure 17A:
FIGS. 17 (a) through 17 (h) are cross-sectional views showing the other embodiments of the vortex generator.
Figure 17F:
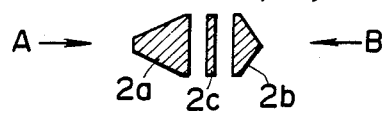
Figure 17B:
Figure 17G:
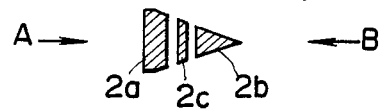
Figure 17C:
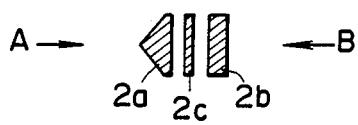
Figure 17H:
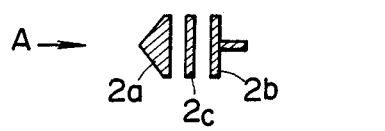
Figure 17D:
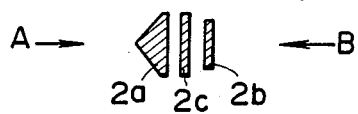
Figure 17E:

FIG. 17(a) through 17(h) show various forms of the vortex generators' cross section for example. In FIG. 17, the respective FIGS. of 17(a) through 17(f) show various combinations of the upstream-side vortex generating elements 2a of the isosceles triangle with the downstream-side vortex generating elements 2b being a trapezoid, a circular arc, a rectangle and a triangle, respectively. In such an arrangement of elements, it is possible to construct a vortex generator capable of receiving fluid that is flowing in either direction A or B by selecting the size or dimension from the tendency of the vortex frequency as shown in FIG. 16. FIG. 17(g) shows a combination of a trapezoid and a triangle and FIG. 17(h) shows another combination of a triangle and a T-shape. On that occasion, the direction of the fluid's flow is limited to A only.

As is apparent from the foregoing description, according to the present invention, it will be possible to provide a vortex flow meter in which a wide range of the flow rate of 1:50 or more can be obtained as compared with the narrow range of the prior art flow rate measurement of 1:20, as a result of the mutual action of the upstream-side vortex generating element and the downstream-side vortex generating element. Having a little lower vortex frequency, both compensate for each other in the Reynolds number characteristic thereof, and further, since the amplifying action of one vortex is added to the other, a stable vortex flow measurement can be realized.

Figure 18:
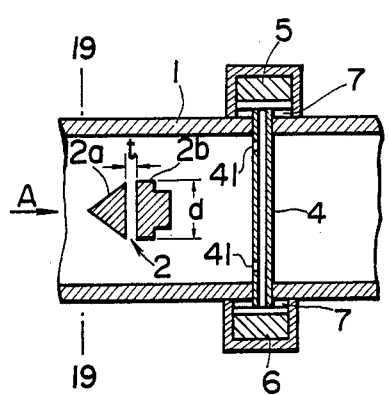
FIG. 18 is a plane cross-sectional view of a vortex flow meter according to the present invention.
Figure 19:
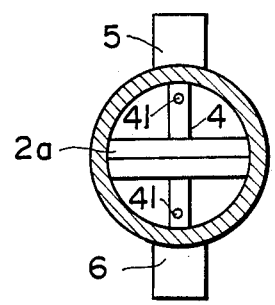
FIG. 19 is a cross-sectional view taken along the line 19—19 of FIG. 18.

FIG. 18 is a plane cross-sectional view of a vortex flow meter according to another embodiment, and FIG. 19 is a cross-sectional view taken along the line B—B of FIG. 18. In the vortex flow meter shown in FIGS. 18 and 19, an ultrasonicbeam is used as a vortex detecting means. In a fluid flowing passage 1, vortex generating elements 2a and 2b are arranged in parallel against the fluid's flow in the direction of the flow A and perpendicular thereto. The vortex generator 2 is constructed in combination with those vortex generating elements 2a and 2b.

At the downstream-side of the vortex generating element 2b, a tubular body 4 is fixedly installed so as to intersect the element 2b and pass through the tube wall of the fluid passage 1. A pair of pressure-guiding holes 41 are formed on the tube wall of the tubular body 4. By guiding the pressure variation, caused at the time of a vortex's occurrence, into the tubular body 4, the fluid's flow variation occurring in the tubular body 4 is received by a receiving element 6 as a signal modified by the velocity vector sum of the ultrasonic waves transmitted from the ultrasonic oscillation element 5 and the afore-mentioned fluid flow variation.

According to the result of the experiments, the vortex frequency of the vortex generating element 2a was 310 Hz and that of the vortex generating element 2b was 250 Hz. The ratio of both frequencies is approximately 0.8 on the standard basis of the former (the element 2a). When the representative length of both elements is d, the optimum point exists in the case that the distance between both elements is 0.1d to 0.9d, and thereby an excellent characteristic of the flow rate range of 1:50 or more is realized. Furthermore, the vortex frequency is increased and a more stable vortex of about 1.5 times can be obtained compared with that of the prior art.

In other experiments the vortex frequency ratio of the upstream-side vortex generating element 2a and the downstream-side vortex generating element 2b became an important factor in the instrumental error of the flow meter. It was found that the above-mentioned characteristic couldn't be obtained if the frequency ratio was out of the range of 0.7 to 0.9. Although there are many combinations of the vortex generating elements, an excellent characteristic was obtained by the use of the combination of the two shapes i.e. the equilateral triangle and the T-shape, according to the present invention. Moreover, the vortex is detected by the phase modulation method by use of an ultrasonic detection means and, as a matter of course, it's possible to use pressure, heat, light rays or other means as a means of detection instead of ultrasonic beams.

As is apparent from the foregoing description, according to the present invention, the characteristic of instrumental error has been improved by noticing the vortex frequency ratio of the vortex generators alone and by combining them with each other. Furthermore, it follows that the frequency of the vortex occurrences increases and the application area has been enlarged in the field of the vortex flow meter combined with a control system requiring a quick response.

Figure 20:
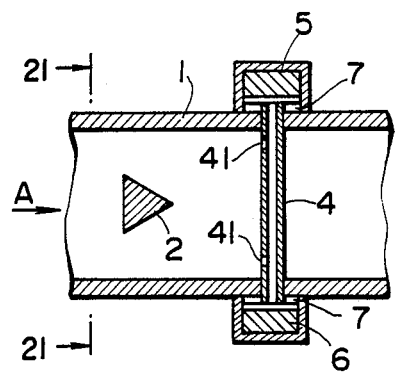
FIGS. 20 and 21 are structural views of the prior art vortex flow meter with FIG. 21 being a cross-sectional view taken along the line 21—21 of FIG. 20.
Figure 21:
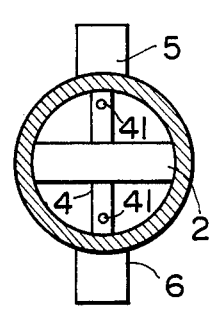

The present applicant proposed a vortex flow meter described in the Japanese Patent Application No. 58-60333/1983 (laying-open No. 59-187222/1984, in which a tubular member 4 is disposed behind a vortex generator 2 in a direction of intersecting it as shown in FIG. 20 (FIG. 21 is a cross-sectional view taken along the line B—B of FIG. 20) and at least one pair of pressure guiding holes 41 are formed at a predetermined interval in the direction of the tubular member's 4 axis. The present applicant noticed that, in the flow meter as mentioned above, the fluid's variation of flow had been caused by applying a variation to the inside of the tubular, member 4, and the fluid's flow had been rectified by guiding a fluid-flowing variation into the tubular member 4 having a comparatively small circumference for passing therethrough. In such a manner, a turbulence vortex contained in the flow of the fluid in the fluid passage wasn't detected as compared with the case when there is no tubular member. Consequently, a noise component of the detection signal decreased and thereby the detection signal of an excellent S/N characteristic was obtained. The detection of the vortex signal already generated was improved in such a manner as mentioned above. And further, with respect to the vortex generator, an acute-angled isosceles triangular element was disposed in direction A of the fluid's flow and independent flat plates were arranged respectively behind the element, in order, at a desired interval, as shown in the published specifications of Japanese Patent Publication No. 55-40804/1980. In such a manner, an amplifying effect was given to the vortex and thereby a strong and stable vortex could be generated.

According to the above-mentioned prior art, a stable vortex flow meter which didn't exist in the past could be realized in combination with a vortex generating means for generating a strong and stable vortex and a detection means for detecting the vortex generated by the vortex generating means having an excellent S/N characteristic. However, in order to perform a wider range of flow rate measurement, it was necessary to get a stronger vortex signal and keep the value of the Strouhal number with a wide-rang and also constant to correspond to the above-mentioned conditions. Furthermore, the vortex flow meter had a plus instrumental error in the low flow rate area, as described in the aforementioned published specifications of Japanese Patent Publication No. 55-40804/1980. Therefore, although the vortex generator was stable, it was unsatisfactory for a flow meter requiring a wide range of flow rate measurement.

The present invention was created in consideration of the above-mentioned subject manner. The present applicant noticed that, in the construction of the vortex detection means, in which the prior art pressure guiding holes 41 had been arranged, in the direction of the tubular member 4's axis, the vortex generated by the vortex generator had been peeled off therefrom three-dimensionally as a vortex pillar, and the present applicant formed pressure guiding holes in the direction of the vortex pillar in order to effectively guide the pressure variation. The present applicant further noticed that the vortex generating elements which made up the vortex generator had an independent vortex frequency ratio of the purpose of obtaining a flow meter having an excellent linear characteristic with a wide range of flow rate measurement by improving the characteristic inherent in the vortex generator. As a result, the subject manner of the prior art was settled.

FIGS. 22 through 25 are structural views for explaining an embodiment of another invention. In FIGS. 22 through 25, the same reference numeral is attached to the part of the same construction as that of the prior art shown in FIGS. 20 and 21. The vortex generator 2 is constructed with a vortex generating element 2a made of an isosceles triangular cross section placed at the upstream-side, a vortex generating element 2b made of a T-shaped cross section disposed at the downstream-side, and a flat plate element 2c disposed therebetween. Those elements are arranged in order 2a, 2c, and 2b at the upstream-side, and the representative length d thereof is opposed to the other respectively. A tubular member 4, for guiding the pressure variation due to a vortex, is supportedly placed behind a vortex generator 2, installed in such a manner as mentioned above, so as to intersect the vortex generator 2 and pass through the wall of the fluid passage 1.

Figure 24:
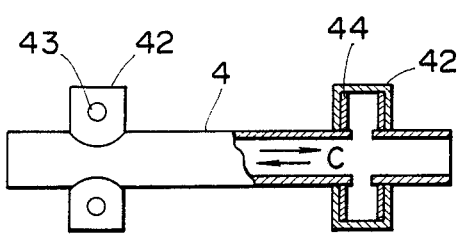

FIG. 24 shows the details of the tubular member 4. A pair of tube members 42 are firmly fixed onto the tubular member 4 so as to cross the same perpendicular thereto and to communicate therewith. And further, the end surface of the tube members 42 is closed, and a plurality of pressure guiding holes 43 are opened on the wall of the straight tube member 42. The pressure variation is guided into the pressure guiding holes 43 and fluid displacement, corresponding thereto, is caused as shown by the arrows C in FIG. 24. In the case of detecting the fluid displacement, a modulated ultrasonic signal, sound absorbing material 44 such as unwoven raw cloth, is stuck on the inner-wall surface of a pair of tube members 42 so as to coat the same for the purpose of preventing a turbulent component of ultrasonic waves, contained in the flowing fluid, from entering into the tube members 42.

Figure 22:
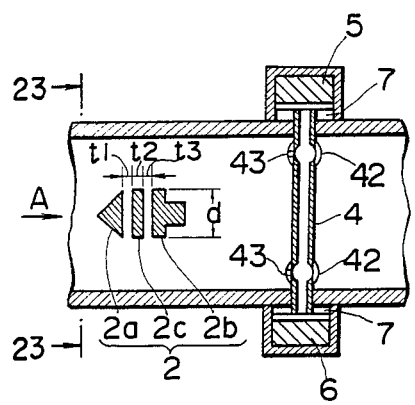
Figure 23:
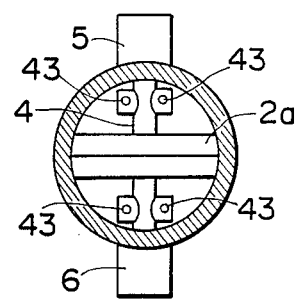
Figure 25:
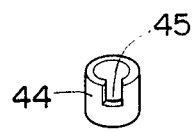

FIG. 25 is a perspective view of sound absorbing material 44. A notch 45 is formed so as not to close the pressure guiding hole 43. On the other hand, the vortex generator 2 is constructed in such a way that the ratio of the vortex frequency of the vortex generating element 2a and that of the vortex generating element 2b turns out to be 0.7 to 0.9. The flat plate element 2c is placed between those vortex generating elements parallel thereto. With respect to the position relationship of those elements, dimensions $t_1$, $t_2$ and $t_3$, as shown in FIG. 22, are determined respectively, wherein $t_1$ is a certain distance between elements 2a and 2c, $t_2$ has a certain thickness of element 2c, and $t_3$ has a certain distance between elements 2c and 2b. The values of $t_1$ to $t_3$ are so selected as to equal to 0.1d and 0.4d ($t_1 \sim t_3 = 0.1d \sim 0.4d$). The vortex flow meter, constructed in such a manner as shown in FIGS. 22 through 25, is capable of getting a vortex of an excellent linear characteristic through the action of the interference due to the vortex frequency difference between the respective vortex generating elements.

To state in more detail, since the vortex generating frequency of the downstream-side vortex generating element 2b is low, the circulation of the vortex is strong and dominates the high-Reynolds number area, and the frequency difference of the vortex generated at the low Reynolds number regulates the vortex frequency in the low-Reynolds number area by the action of the interference, with the vortex, of the vortex generating element 2a occurring in the gaps between vortex generating elements 2a and 2b.

The vortex peeled off from the vortex generator as mentioned above flows down as a vortex pillar, parallel to the axis of the vortex generator, and therefore a pressure variation appears with a tendency following the vortex flow. Consequently, the guided pressure difference is increased, and made even.

Figure 26:
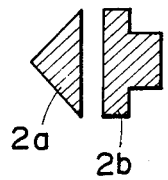
FIGS. 26 through 28 are cross-sectional views showing other embodiments of the vortex flow meter according to the present invention.
Figure 27:
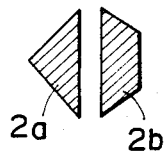
Figure 28:
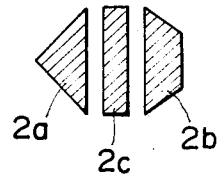

And further, a flat plate element 2c is employed for guiding the vortex generated by the vortex generating element 2a into the area between the gaps t₁ and t₃ and for obtaining an increasing amplification effect. In addition to the construction of the vortex generator shown in FIG. 22, the other various constructions thereof can be realized. These are the constructions in combination with a triangular pillar (a T-shaped pillar), a trapezoidal pillar, and a flat plate as shown in FIGS. 26, 27 and 28. It is important to add the afore-mentioned conditions to those constructions.

As is apparent from the foregoing description, according to the present invention, it will be possible to provide a vortex flow meter in which a stable vortex signal of an excellent linear characteristic proportional to the rate of flow can be generated over a wide range of the vortex generating frequency, and on the other hand, since a stronger pressure variation can be obtained at the time of detecting the vortex, the measurement range of the flow meter becomes considerably wider in relation to both of the above-mentioned matters.

We claim:

1. A vortex generator for measuring fluid flow in an elongated circuit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means having one plate side spaced from said upstream base side and another plate side spaced from said downstream side, said plate means having a trapezoidal cross-sectional configuration.

2. A vortex generator for measuring fluid flow in an elongated conduit having a central axis comprising a vortex generator means disposed in said conduit, a tube means in said conduit downstream of said vortex generator means, said tube means having an elongate section and a pair of transverse tube sections which extend perpendicular to said elongate section, said conduit having conduit wall openings, said elongate section having end portions which pass through said wall openings and which are disposed externally of said conduit, said transverse tube sections being disposed in said conduit and being spaced from one another, and means defining holes in said transverse tube sections such that the effect of the fluid passing into said holes indicates the fluid flow through said conduit.

3. A vortex generator according to claim 2 wherein said elongate section has a longitudinal axis, each of said transverse tube sections having first and second parts extending on opposite sides of said longitudinal axis.

4. A vortex generator according to claim 3 wherein each of said first and second parts has one of said holes.

5. A vortex generator according to claim 3 wherein each of said first and second parts have closed ends.

6. A vortex generator according to claim 3 further comprising sound-absorbing material within each of said first and second parts.

7. A vortex generator according to claim 6 wherein said sound-absorbing material is unwoven cloth.

8. A vortex generator according to claim 2 further comprising ultrasonic detecting means on said end portions of said elongate section of said tube means.

9. A vortex generator according to claim 4 wherein said vortex generator means comprises an upstream and a downstream vortex generator disposed transversely in said conduit, said upstream vortex generator having an upstream side and a downstream base side, said downstream vortex generator having a downstream side and an upstream base side, said upstream and downstream base sides being in spaced relationship to one another to provide a combinational vortex frequency of said upstream and downstream vortex generators, said upstream and downstream vortex generators having a generated vortex frequency, when installed singly within said conduit, such that the ratio of said generated vortex frequency of said downstream vortex generator, when singly installed, relative to said generated vortex frequency of said upstream vortex generator, when singly installed, is within the range of 0.7 to 0.9.

10. A vortex generator for measuring fluid flow in an elongated conduit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means having one plate side spaced from said upstream base side and another plate side spaced from said downstream side, the length of said downstream base side of said upstream vortex generator being greater than the length of said upstream base side of said downstream vortex generator.

11. A vortex generator for measuring fluid flow in an elongated conduit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means having one plate side spaced from said upstream base side and another plate side spaced from said downstream side, said downstream vortex generator having a generally semi-circular cross-sectional configuration.

12. A vortex generator for measuring fluid flow in an elongated conduit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means having one plate side spaced from said upstream base side and another plate side spaced from said downstream side, said downstream side of said downstream vortex generator having a semi-circular configuration.

13. A vortex generator for measuring fluid flow in an elongated conduit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means havine one plate side spaced from said upstream base side and another plate side spaced from said downstream side, said upstream vortex generator having a generally trapezoidal cross-sectional configuration.

14. A vortex generator for measuring fluid flow in an elongated conduit having a central axis, comprising an upstream and a downstream vortex generator disposed transversely in said conduit, said upstream vortex generator having an upstream side and a downstream base side, said downstream vortex generator having a downstream side and an upstream base side, said upstream and downstream base sides being substantially flat and parallel surfaces which are spaced from one another, and plate means disposed in said space between said base sides, said plate means having one plate side spaced from said upstream base side and another plate side spaced from said downstream side, said downstream vortex generator having a generally trapezoidal cross-sectional configuration.

* * * * *